(12) United States Patent
Mauritz et al.

(10) Patent No.: US 9,207,147 B2
(45) Date of Patent: Dec. 8, 2015

(54) METHOD FOR PREDICTING A ROTATIONAL SPEED OF A CRANKSHAFT IN AN INTERNAL COMBUSTION ENGINE

(71) Applicant: Robert Bosch GmbH, Stuttgart (DE)

(72) Inventors: Ewald Mauritz, Weissach (DE);
Markus Roessle, Stuttgart (DE);
Matthias Cwik, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 14/369,078

(22) PCT Filed: Dec. 27, 2012

(86) PCT No.: PCT/EP2012/076951
§ 371 (c)(1),
(2) Date: Jun. 26, 2014

(87) PCT Pub. No.: WO2013/098324
PCT Pub. Date: Jul. 4, 2013

(65) Prior Publication Data
US 2014/0336906 A1 Nov. 13, 2014

(30) Foreign Application Priority Data
Dec. 30, 2011 (DE) .......................... 10 2011 090 151

(51) Int. Cl.
*G01M 15/04* (2006.01)
*F02N 11/08* (2006.01)

(52) U.S. Cl.
CPC ......... *G01M 15/046* (2013.01); *F02N 11/0855* (2013.01); *F02N 2200/022* (2013.01); *F02N 2300/2006* (2013.01)

(58) Field of Classification Search
CPC . G01M 15/04; G01M 15/046; F02N 11/0855; F02N 2200/022
See application file for complete search history.

(56) References Cited

U.S. PATENT DOCUMENTS

| 7,749,130 B2 * | 7/2010 | Muta ........................ F16H 61/16 475/5 |
| 8,088,035 B2 * | 1/2012 | Yamamoto ............. B60K 6/445 477/101 |
| 8,215,425 B2 * | 7/2012 | Hayashi ................. B60K 6/445 180/65.265 |

FOREIGN PATENT DOCUMENTS

| DE | 10217560 | 4/2004 |
| DE | 102008041037 | 2/2010 |
| DE | 102010001257 | 7/2011 |
| DE | 102010001762 | 8/2011 |
| DE | 102011000411 | 8/2011 |
| DE | 102010009648 | 9/2011 |
| GB | 2468906 | 9/2010 |

OTHER PUBLICATIONS

International Search Report for Application No. PCT/EP2012/076951 dated Apr. 19, 2013 (English Translation, 3 pages).

* cited by examiner

*Primary Examiner* — Hieu T Vo
(74) *Attorney, Agent, or Firm* — Michael Best & Friedrich LLP

(57) ABSTRACT

Method for predicting a rotational speed (n) of a drive shaft (16) in an internal combustion engine (13), wherein a past rotational speed (n) of the drive shaft (16) is determined, characterized in that in order to determine a theoretical rotational speed (nT1, nT2) of the drive shaft (16) at a future point in time (tT1, tT2), the change in the rotational speed (n) between two past events (P01, P11; P02, P12) occurring at different times is used, one rotational speed (n01, n11; n02, n12) and one point in time (t01, t11; t02, t12) being assigned to each event, wherein one point in time (t01, t02) is an earlier point in time and the other is a later point in time (t02, t12), which therefore lies before the predicted point in time (tT1, tT2), wherein a gradient (m) is determined for a period between the two events (P01, P11; P02, P12) and is used as the basis for deducing a theoretical future rotational speed (nT1, nT2) at the future point in time (tT1, tT2), such that in order to determine the theoretical rotational speed (nT1, nT2) of the drive shaft (16) at the future point in time (tT1, tT2), the determined gradient (m) is used to determine the theoretical rotational speed (nT1, nT2) at the future point in time (tT1, tT2), on the basis of the later point in time (t02, t12), thus determining whether the theoretical rotational speed (nT1, nT2) actually occurred before the future point in time (tT1, tT2) or not until afterwards.

14 Claims, 2 Drawing Sheets

METHOD FOR PREDICTING A ROTATIONAL SPEED OF A CRANKSHAFT IN AN INTERNAL COMBUSTION ENGINE

BACKGROUND OF THE INVENTION

DE 10 2010 009 648 A1 discloses a method for determining a rotational speed of a driveshaft of an internal combustion engine, which method is intended to permit a drive pinion of a starter device to be engaged in the internal combustion engine which is said to be coasting. Such methods serve in particular to generate a precise prediction for the rotational speed profile in a rotational speed range of the driveshaft of the internal combustion engine of above 30 revolutions per second. Below the rotational speed of 30 revolutions per minute the driveshaft can change its rotational direction and therefore "swing back" (rotational pendulum). As a result of this "swinging back" the rotational speed usually changes repeatedly from positive to negative and again to positive and possibly once more to negative rotational speeds in order to approach the stationary state earlier or later.

It is provided to present a method with which suitable points in time are determined in order to engage a drive pinion in the ring gear of the internal combustion engine during this swinging back.

SUMMARY OF THE INVENTION

The method according to the invention having the features of the invention has the advantage that it is possible to reliably determine the curved sections in which favorable events for appropriate engagement will occur. On the basis of this knowledge it can be reliably decided whether engagement of the starting pinion immediately after the end of the calculation is appropriate or not.

Further advantages result from the invention. There is therefore provision, for example, that the method is not applied until, after coasting of the internal combustion engine has started, the driveshaft rotates the first time counter to a drive rotational direction, and therefore the rotational speed of the driveshaft is negative. This is appropriate since essentially directly before the first zero crossover from a positive rotational speed to a negative rotational speed brief rotational speed sections which are difficult to calculate or virtually impossible to calculate can occur, said rotational speed sections making reliable prediction hardly possible or impossible. The result which can be calculated differs greatly from practical results. According to one embodiment of the invention there is provision that, on the one hand, the driveshaft rotates counter to a drive rotational direction and the rotational speed at what is referred to as the late point in time is also negative and what is referred to as the theoretical rotational speed has occurred. On the basis of this data and/or results it is possible to determine that although the rotational speed profile is in a negative rotational speed branch, i.e. the rotational speed of the driveshaft is negative, but the change in the rotational speed of the driveshaft is positive.

BRIEF DESCRIPTION OF THE DRAWINGS

The invention will be explained in more detail by means of at least one exemplary embodiment and with reference to drawings, in which.

DETAILED DESCRIPTION

Figure 1:
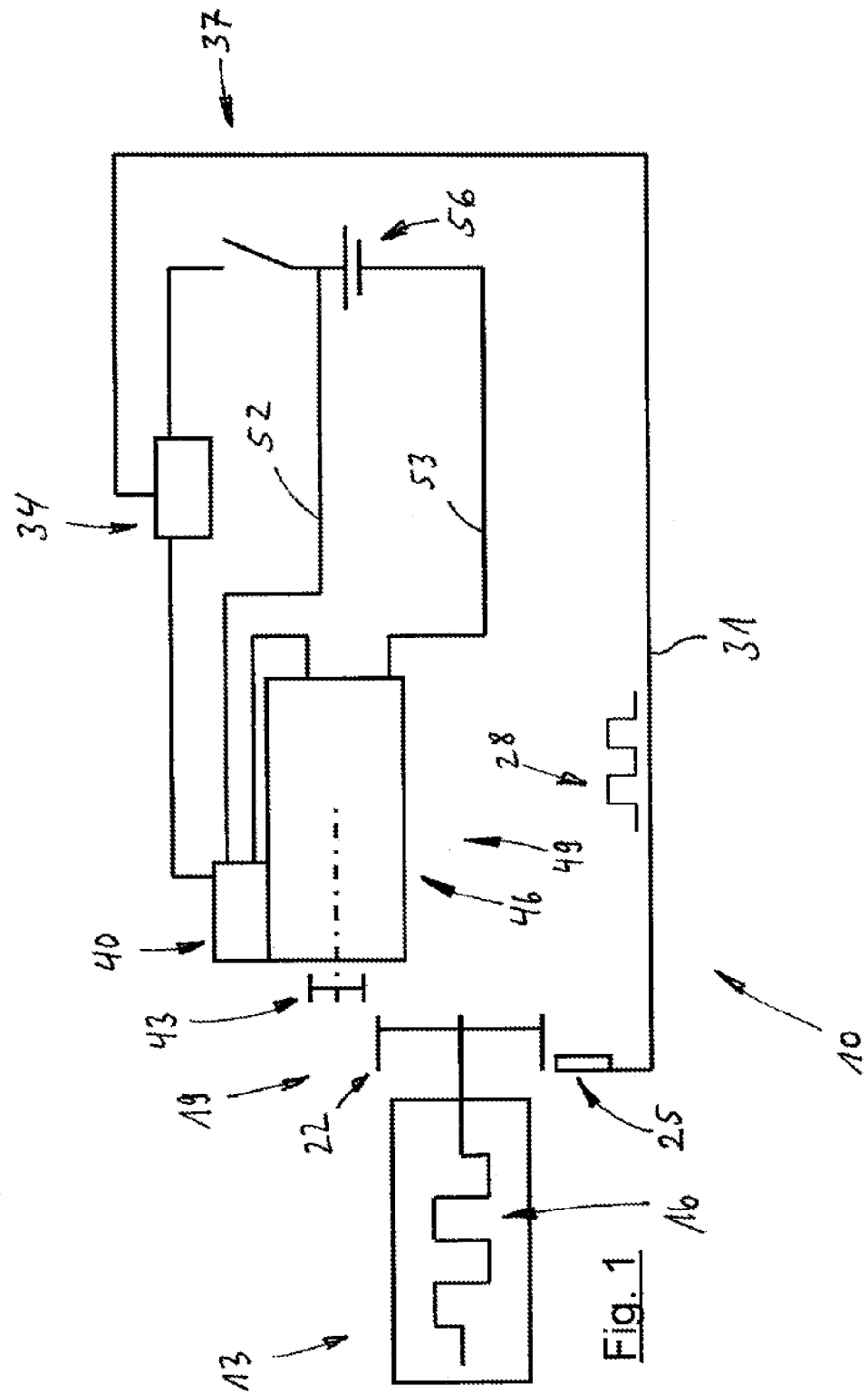
FIG. 1 shows a schematic view of a system, formed from an internal combustion engine with a ring gear, a starter device with a starting pinion and a lifting magnet, a control unit, a starter switch, a battery and a sensor.

FIG. 1 is a schematic illustration of the arrangement of a system or device 10 in a motor vehicle. This device 10 has an internal combustion engine 13 with a driveshaft 16 which is embodied, for example, as a crankshaft. At one of the driveshaft 16, or in the vicinity thereof, there is a ring gear 19 with which a signal transmitter wheel 22 rotates. The signal transmitter wheel 22 has signal-transmitting elements whose movement is detected by a sensor 25. The sensor 25 transmits signals 28 to a control device 34 via a signal line 31. A starter switch 37 is connected, for example, to the control device 34 which receives a signal, for example when the starter switch 37 closes. The control device 34 is in turn connected to a motor 40 which is embodied here, for example, as a lifting magnet. The lifting magnet which is here operated electromagnetically is therefore referred to a motor 40 because the electromagnetic lifting magnet is suitable for converting electrical energy into kinetic energy. The lifting magnet is therefore in a strict sense a device which generates a movement. When a specific signal is received by the control device 34, this motor 40 is capable of engaging a starting pinion 43 in the ring gear 19 by means of a gear mechanism (not illustrated here) which can be embodied, for example, in the form of a lever mechanism. Subsequent to this or simultaneously, a drive motor 46 can be switched on by the motor 40 in order to drive the starting pinion 43. The motor 40, the starting pinion 43 and the drive motor 46 are parts of the starter device 49 illustrated here. If the motor 40 is embodied as a classic engagement relay, this motor 40 switches the drive motor 46 by means of a contact bridge, with the result that said drive motor 46 is supplied with current from the battery 56 via a feed line 52 and a ground line 53.

Figure 2:
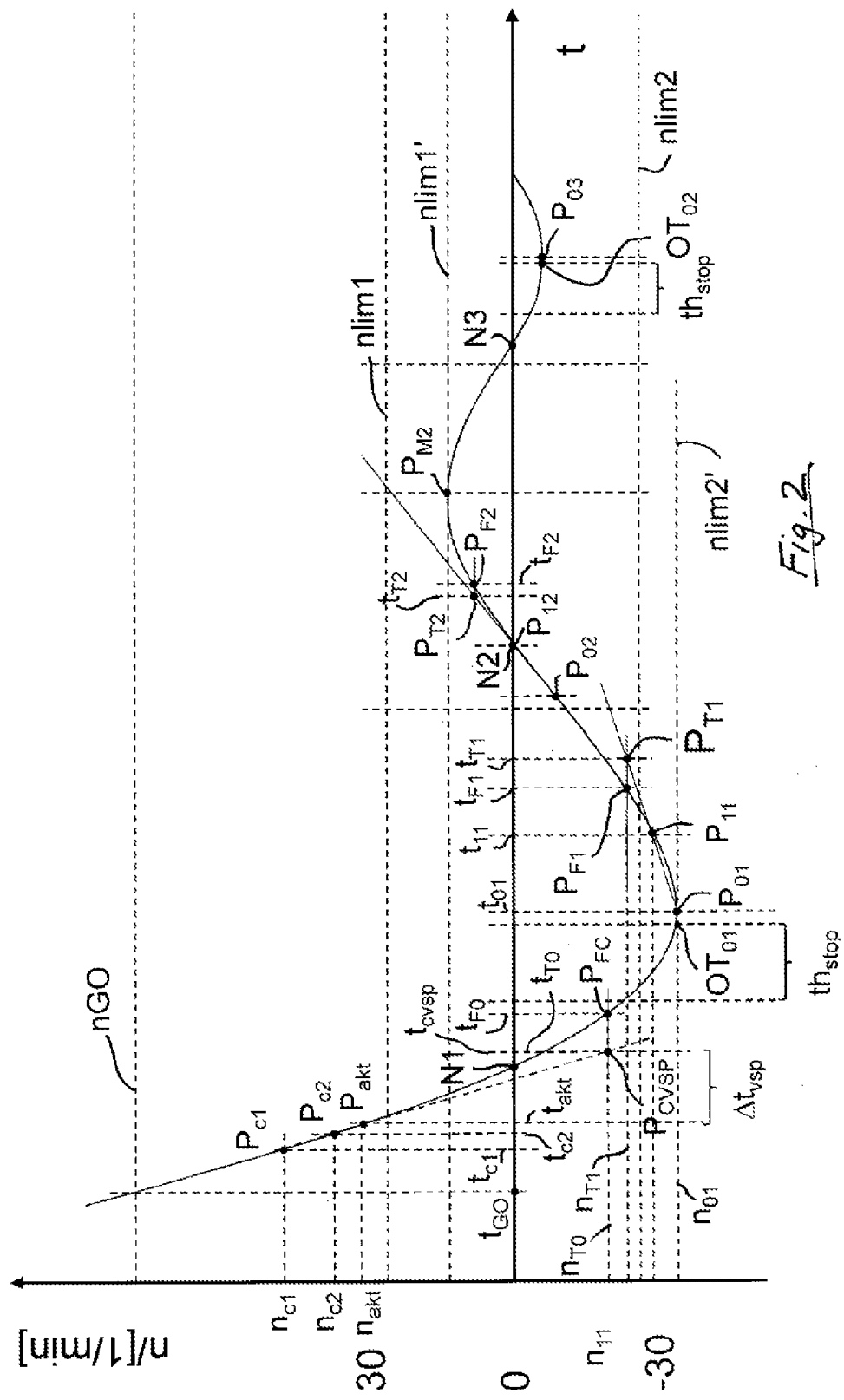
FIG. 2 shows an exemplary rotational speed/time diagram which shows the time-dependent rotational speed profile of a driveshaft.

A rotational speed profile plotted against the time is illustrated in FIG. 2. Two different situation examples are illustrated in this diagram.

The first example of a situation occurs chronologically after the first zero crossover N1 and just after a first minimum. This example is determined, as are all the examples, by four points (P01, P11, PT1 and PF1). These points are below a rotational speed limit nGO which is, for example, a trigger for the start of the method presented here.

The point P01 is characterized by the point in time t01 and the associated rotational speed n01, and the point P11 is characterized by the associated time t11 and the associated rotational speed n11. A gradient m1 which simplifies the situation present here can be determined in a known fashion from these four data items. This gradient m1 is obtained as the difference between the rotational speed n11 and the rotational speed n01 divided by the time difference formed from t11 and t01, with the result that the subsequent equation for the gradient in the first example is obtained as follows:

$$m1 = (n11 - n01)/(t11 - t01) \tag{1}$$

or generally as $$m = (n1 - n0)/(t1 - t0). \tag{2}$$

This gradient m1 is referred to generally as gradient m.

Starting from the point P11 to time t11, a predicted time tT1 is therefore obtained for a theoretical rotational speed nT1 to which a prediction is made starting from the point P11 with the gradient m1.

The following applies:

$$m1=(nT1-n11)/(tT1-t11) \quad (3)$$

with the result that for the predefined point in time tT1 a predicted (theoretical) rotational speed nT1 is obtained as $$nT1=n11+m1*(tT1t11). \quad (4)$$

If the rotational speed nT1 is predefined, a predicted point in time tT1 is obtained as $$tT1=t11+(nT1-n11)/m1. \quad (5)$$

The equations (4) and (5) can be readily generalized and can also be applied to the other situation example.

For n01=−38/min, n11=−33/min, t01=44 ms (milliseconds), t11=56 ms, according to equation (1) a gradient m1 of $$m1=(-33(-38))/((56 \text{ ms}-44 \text{ ms})\text{min})=0.42/(\text{ms}*\text{min})$$

is obtained.

By means of this gradient value and the equation (5) for the predicted time tT1 the following is then obtained by means of the target rotational speed nT1=−27/min, to be achieved by way of example, with the equation:

$$tT1=56 \text{ ms}+(-27/\text{min}(-33/\text{min}))/(0.42/(\text{ms}*\text{min}))=70 \text{ ms}$$

However, in fact in this example the target rotational speed nF1=nT1 should have already been reached at the point in time tF1=62 ms. This can be determined, for example, by measuring by means of the sensor 25 already mentioned or by computational determination.

In this example, a difference of −8 ms is then obtained for the difference between the predicted time tT1 and the actual time tF1. That is to say the predicted rotational speed nT1 occurred 8 ms earlier than predicted.

The rotational speed n11 is therefore negative and the predicted time tT1 is in the future considered in terms of the point PF1 which describes the situation of the achieved predicted target rotational speed nT1 at the actual point in time tF1. The internal combustion engine is therefore in a negative rotational speed load/rotational speed range and the rotational speed is rising again. In this general situation, engagement of the starting pinion 43 in the ring gear 19 is appropriately possible.

The second situation is described by the points P02, P12, PT2 and PF2.

For n02=−10/min, n12=0/min, t02=78 ms, t12=86 ms, according to equation (1) a gradient m2 of $$m2=(0-(-10))/((86 \text{ ms}-78 \text{ ms})\text{min})=1.25/(\text{ms}*\text{min})$$

is obtained.

By means of this gradient value and equation (5) for the predicted time tT2, the following is then obtained for this target rotational speed nT2=9/min, which is then to be achieved by way of example, with the equation:

$$tT2=86 \text{ ms}+(9/\text{min}(0))/(1.25/(\text{ms}*\text{min}))=93.2 \text{ ms}.$$

However, in fact in this example the target rotational speed nF2=nT2 should not have been achieved until the point in time tF2=96 ms. This can be determined, for example, by measurement by means of the sensor 25 already mentioned or computational determination.

In this example, a difference of 2.8 ms is then obtained for the difference between the predicted time tT2 and the actual time tF2. That is to say the predicted rotational speed nT2 does not occur until 2.8 ms later than predicted.

This method is activated for example below an upper limit rotational speed nGO and for example is only carried out starting from the first zero crossover 1.

For the situation 2, according to which the rotational speed n12 is zero or is positive in similar cases occurring slightly later, the predicted time tF2 is in the past when the target rotational speed nT2 is reached. The internal combustion engine is therefore in a positive rotational speed branch. The rotational speed continues to rise, and engagement is therefore reasonably possible at any time.

If determination were to be carried out for a situation after the high point PM2 and before the zero crossover N3, the rotational speed n0x would be positive and the gradient m would be negative and therefore a predicted rotational speed nTx would be reached early or a predicted time tTx would be in the future. Engagement would therefore be reasonably possible toward the predictive point in time.

If determination were carried out for a situation after the zero crossover N1 and before the low point—here P01—the rotational speed n0x would be negative and the gradient m would be negative and therefore a predicted rotational speed nTx would be reached late and a predicted time tTx would be in the past. Owing to the rotational speed which would therefore continue to drop, engagement would therefore not be reasonably possible toward the predicted point in time.

It is therefore preferred to engage in a rotational speed range in which the predicted rotational speed and also the gradient are positive.

It is also preferred alternatively to engage in a rotational speed range in which the predicted rotational speed is negative and the gradient positive. It is therefore ensured that engagement occurs as early as possible.

If the rotational speed range is positive and the gradient is negative, a range before N3—with a predicted rotational speed nTx before N3—is to be avoided since for the engagement there can actually be a negative rotational speed of the ring gear 19.

In the negative rotational speed range after P01 (low point), engagement is appropriate if the predicted time is reached.

The method is carried out continuously and the predictions continuously updated. It is apparent here that in the case of equally long time periods under consideration after P01 a time difference between a time which is actually reached and a predicted time can be shorter. Starting from a disengagement time which is typical for a starter device it is possible to use a prediction for as long as the current time is not closer to the prediction time than a maximum disengagement time. A prediction would be started at the last possible point in time.

The method can also be used for coasting situations which take place before the first zero crossover N1. For example, this situation is specified for a point Pc1 and the time thereafter. The point Pc1 connects a specific rotational position of the driveshaft 16 to a specific rotational speed nc1 at a specific point in time tc1. The next point Pc2 also connects a specific rotational position of the driveshaft 16 to a specific rotational speed nc2 at a specific point in time tc2. In a known fashion this results in a gradient mc1. The calculation of the gradient mc1 for this is ended for example at the point in time takt which is after the point in time tc2. The rotational speed nakt occurs over the gradient mc and the time difference with respect to nc2. If calculation is then carried out further for a time period Δtvsp after takt and with mc1, a rotational speed nvsp at the point in time tcvsp is obtained for the linearly extrapolated state at the point Pcvsp=PTc. The time period Δtvsp corresponds to the time period which is necessary to set a pinion actually in motion (pre-engage) after its first activation ("engagement" signal) by a control device and to engage it in the ring gear. The calculation method can alternatively also proceed in such a way that at the point in time takt both mc1 is calculated, and with mc1 the point in time tcvsp and the predicted rotational speed ncvsp is known.

A second rotational speed nlim2 of the driveshaft (16) below which a drive pinion 43 is not engaged is preferably predefined.

If the determined rotational speed is within the limits nlim1 and nlim2, engagement is permitted and engagement could therefore be brought about immediately. If the calculated rotational speed ncvsp is below nlim2, a new gradient m must be determined starting from a new point, and the method has to be carried out again as described above.

The future point in time tT0, tT1, tT2 which is deduced, can be determined directly or indirectly from the later point in time tc2, t02, t12. It will be direct if the point in time was calculated without the time difference takt=tc2 and mc were used directly to deduce tcvsp from tc2. The indirect method has been described above.

In the event of an updated point in time takt being used during the indirect determination starting from the later point in time tc2, t02, t12, the theoretical rotational speed nakt of which point in time is determined using the gradient (m), the comparison of the properties of PF1 and PT1, PF2 and PT2, and entirely analogously of PFc and PTc, can occur as described above.

There is provision that a time difference between the future point in time tT0, tT1, tT2 and a) the later point in time tc2, t02, t12 or b) the updated point in time takt is a necessary pre-engagement time Δtvsp.

A method for predicting a rotational speed n of a driveshaft 16 of an internal combustion engine 13 is therefore provided, wherein the past rotational speed n of the driveshaft 16 is determined, wherein in order to determine a theoretical rotational speed T1, nT2 of the driveshaft 16 at a future point in time T1, T2 the change in the rotational speed n between two past events which are temporally spaced apart P01, P11; P02, P12, which are each assigned a rotational speed n01, n11; n02, n12 and a point in time t01, t11; t02, t12, is used, wherein the point in time t01, t02 is an earlier point in time and the other is a later point in time t02, t12, which is therefore before the predicted point in time tT1, tT2, wherein a gradient m is determined for a time period between the two events P01, P11; P02, P12, by means of which gradient m a future theoretical rotational speed nT1, nT2 at the future point in time tT1, tT2 is deduced in such a way in that in order to determine the theoretical rotational speed nT1, nT2 of the driveshaft 16 at the future point in time tT1, tT2, the determined gradient m is used to determine the theoretical rotational speed nT1, nT2 at the future point in time tT1, tT2 starting from the later point in time t02, t12, it is determined whether the theoretical rotational speed nT1, nT2 actually occurred before the future point in time tT1, tT2 or only afterwards.

There is provision that the latter is applied if, after coasting of the internal combustion engine 13 has started, the driveshaft 16 rotates the first time counter to a drive rotational direction, and therefore the rotational speed n of the driveshaft 16 is negative.

There is provision that the method is applied if the driveshaft 16 rotates counter to a drive rotational direction, the rotational speed n is also negative at the late point in time t02, t12, and the theoretical rotational speed nT1, nT2 has already occurred.

There is provision that the method is applied if the driveshaft 16 rotates in a drive rotational direction at the late point in time t02, t12 and the theoretical rotational speed nT1, nT2 has not yet occurred at the future point in time tT1, tT2 after the last zero crossover N2.

The method is also to be applied if the driveshaft 16 rotates in a drive rotational direction at the late point in time t02, t12 and the theoretical rotational speed nT1, nT2 has already occurred before the determined future point in time tT1, tT2.

The drive pinion 43 is to be actuated in such a way that it engages in a ring gear 19 of the internal combustion engine 13 when the rotational speed n of the driveshaft 16 increases again and/or is positive.

A first rotational speed nlim1 of the driveshaft 16 above which a drive pinion 43 is not engaged is to be predefined.

For the greatest possible accuracy of the calculation there is provision for all the signal-producing elements to be evaluated in specific rotational position ranges of the signal transmitter wheel 22 while outside these rotational position ranges sliding mean values of states of a plurality of rotational positions are evaluated.

The method can also be started if, after the coasting of the internal combustion engine 13 has started, the rotational speed n of the driveshaft 16 is below a rotational speed limit nGO whose occurrence is a trigger for the start of the method, wherein a first zero crossover N1 has not taken place yet.

There is provision that the method is carried out up to a previously determined rotational position thstop of the driveshaft 16 and then stopped and preferably not started again until a rotational speed minimum P01, P03 has been passed through. The rotational position thstop is characterized by a specific signal-producing element at the signal transmitter wheel 22 which precedes a position of a crankshaft before the top dead center.

In addition, further rotational speed limits can also optionally be predefined in order to prevent engagement in an unfavorable rotational speed state of the internal combustion engine. For example, a raised lower rotational speed limit nlim2' (relatively high negative rotational speed) is therefore conceivable for the engagement window, said lower rotational speed limit being effective up to the first minimum of the rotational speed at P01. Here, the gradient of the rotational speed changes from negative to positive. Afterwards, minimum limit nlim2 which is defined on a standard basis can be used. A changed lowered maximum limit nlim1' is also conceivable, said maximum limit nlim1' being effective up to the first rotational speed maximum at PM2 (gradient changes from positive to negative). This therefore ensures that engagement in an unfavorable rotational speed range does not occur even in the case of very high local rotational speed gradients. Such a raised lower rotational speed limit nlim2' or a changed lowered maximum limit nlim1' can also be set, for example, by an empirical value as a function of the instantaneous situation of the internal combustion engine.

FIG. 2 is general, serves for general illustration and is not to scale.

The invention claimed is:

1. A method for predicting a rotational speed of a driveshaft of an internal combustion engine, the method comprising:
determining a past rotational speed of the driveshaft,
determining a theoretical rotational speed of the driveshaft at a future point in time based on
a change in the rotational speed between two past events which are temporally spaced apart, which are each assigned a rotational speed and a point in time, namely a first point in time and a second point in time, respectively,
wherein the first point in time is an earlier point in time and the second point of time is a later point in time and before the future point in time, and
a gradient for a time period between the two past events.

2. The method as claimed in claim 1, wherein the future point in time determined directly or indirectly from the second point in time.

3. The method as claimed in claim 2, wherein in the case of indirect determination of the second point in time an updated point in time is used whose theoretical rotational speed is determined using the gradient.

4. The method as claimed in claim 2, wherein the future point in time is deduced from the second point in time or the updated point in time.

5. The method as claimed in claim 4, wherein a difference in time between the future point in time and a) the second point in time or b) the updated point in time is a pre-engagement time.

6. The method as claimed in claim 1, wherein the method is carried out up to a previously determined rotational position of the driveshaft and then stopped.

7. The method as claimed in claim 1, wherein a drive pinion is not engaged when the rotational speed of the drive shaft is above a first rotational speed.

8. The method according to claim 1, wherein a second rotational speed of the driveshaft is predefined below which a drive pinion is not engaged.

9. A method for predicting a rotational speed of a driveshaft of an internal combustion engine, the method comprising:

determining, after coasting of the internal combustion engine has started, whether the driveshaft rotates counter to a drive rotational direction, and when the drivershaft rotates counter to a drive rotational direction and, therefor; the rotational speed of the driveshaft is negative, determining a past rotational speed of the driveshaft, determining a theoretical rotational speed of the driveshaft at a future point in time based on a change in the rotational speed between two past events which are temporally spaced apart, which are each assigned a rotational speed and a point in time, namely a first point in time and a second point in time, respectively, wherein the first point in time is an earlier point in time and the second point of time is a later point in time and before the future point in time, and a gradient for a time period between the two past events.

10. The method as claimed in claim 9, further comprising determining whether, the rotational speed is also negative at the second point in time, and the theoretical rotational speed has already occurred.

11. The method as claimed in claim 10, further comprising actuating a drive pinion to engage a ring gear of the internal combustion engine when the rotational speed of the driveshaft increases, is positive, or increases and is positive.

12. The method as claimed in claim 9, further comprising determining whether the driveshaft rotates in a drive rotational direction at the second point in time and the theoretical rotational speed has not yet occurred at the future point in time after a last zero crossover.

13. The method as claimed in claim 9, further comprising determining whether the driveshaft rotates in a drive rotational direction at the second point in time and the theoretical rotational speed has already occurred before the future point in time.

14. A method for predicting a rotational speed of a driveshaft of an internal combustion engine, the method comprising:

determining, after coasting of the internal combustion engine has started, whether the rotational speed of the driveshaft is below a rotational speed limit, and if a first zero crossover has not taken place yet determining a past rotational speed of the driveshaft, determining a theoretical rotational speed of the driveshaft at a future point in time based on a change in the rotational speed between two past events which are temporally spaced apart, which are each assigned a rotational speed and a point in time, namely a first point in time and a second point in time, respectively, wherein the first point in time is an earlier point in time and the second point of time is a later point in time and before the future point in time, and a gradient for a time period between the two past events.

* * * * *